April 20, 1948.  L. NASS  2,440,017
ADJUSTABLE DEVICE
Filed May 6, 1947
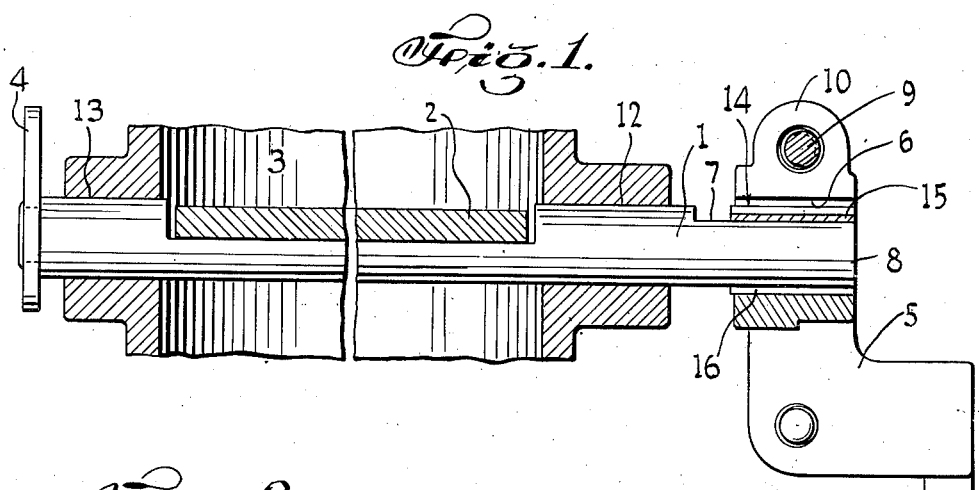
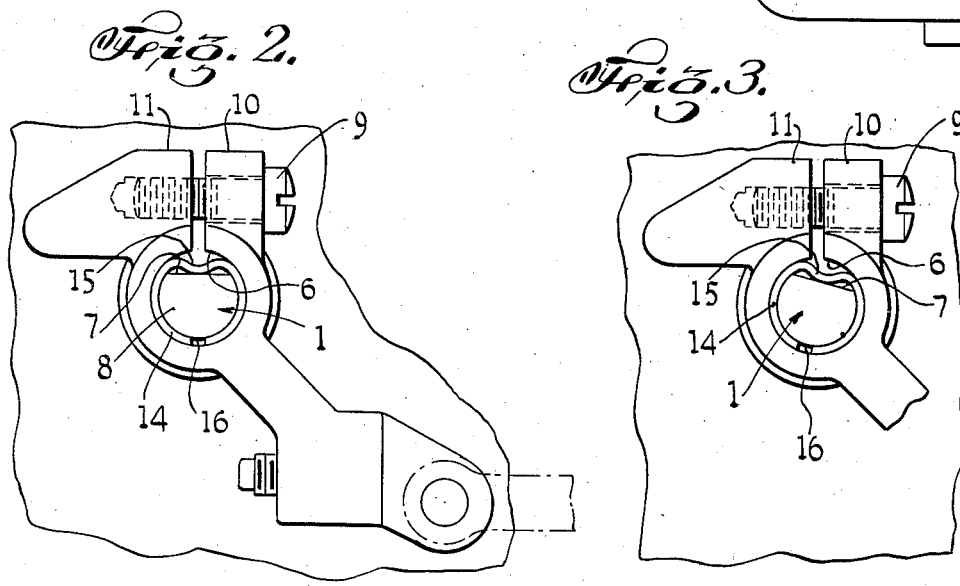
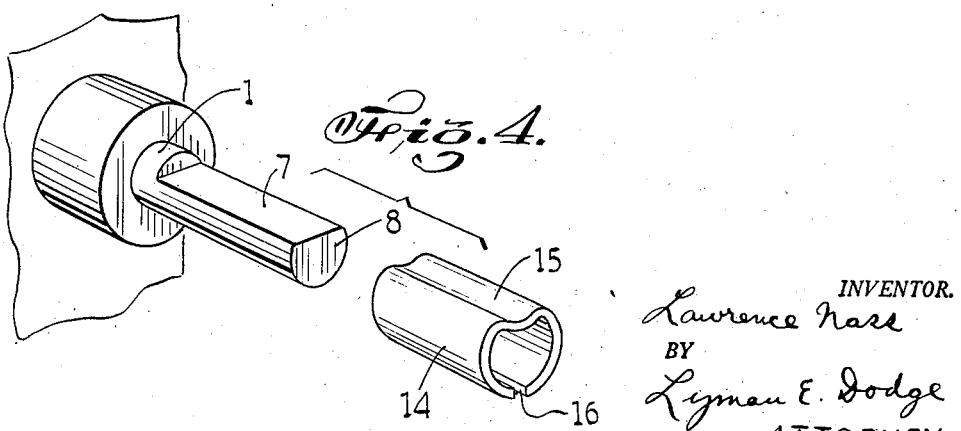
INVENTOR.
Lawrence Nass
BY
Lyman E. Dodge
ATTORNEY Patented Apr. 20, 1948

2,440,017

UNITED STATES PATENT OFFICE 2,440,017

ADJUSTABLE DEVICE

Lawrence Nass, New York, N. Y., assignor to Jerry Briskie, New York, N. Y.

Application May 6, 1947, Serial No. 746,259

2 Claims. (Cl. 287—52.02)

This invention relates to a rotatably adjustable device.

A principal object of this invention is to provide a construction by which a body may be rotatably positioned on a shaft at a plurality of positions and securely held in an adjusted position.

Other objects and advantages will appear as the description of the particular physical embodiment selected to illustrate the invention progresses and the novel features will be particularly pointed out in the appended claims.

In describing the invention in detail and the particular physical embodiment selected to illustrate the invention, reference will be had to the accompanying drawings and the several views thereon, in which like characters of reference designate like parts throughout the several views, and in which:

Fig. 1 is a longitudinal sectional view of a device embodying my invention; Fig. 2 is a right hand end view of the device as shown in Fig. 1; Fig. 3 is a view similar to Fig. 2 showing some of the parts in another adjusted position; Fig. 4 is a perspective exploded view showing the relation of some of the parts of the device included in the structure shown by Fig. 1.

In many cases it is necessary to position a crank arm, or the like, on a shaft and provide a construction such that the crank arm may be rotated to various positions about the shaft and held in adjusted positions.

In Fig. 1 I have shown parts which are in quite common use in connection with a butterfly valve and shaft therefor as used in connection with carburetors and the intake manifold of an internal combustion engine.

In Fig. 1, a shaft 1 is shown which bears a butterfly valve 2 positioned in the duct 3 which may lead to the intake manifold of an internal combustion engine. In order to properly control the butterfly valve there is a crank arm 4 and a crank arm 5 which must bear a definite relation, one to the other, for the proper operation of the butterfly valve 2. The crank arm 4 is usually rigidly attached to the shaft 1. The crank arm 5 is detachably attached to the shaft 1.

In many cases the relation of the parts is precisely the reverse of that shown in Fig. 1, that is, the crank arm 5 is placed on the left hand side of the duct 3, and the crank 4 on the right hand side. It has been usual to provide a flat in the bore 6 of the crank arm 5 so that the flat 7 on the shaft 1 will cooperate therewith and position the shaft correctly in respect to the crank arm, but the flat in the bore 6 can only be positioned for a crank arm which is positioned on the right hand end of the shaft as in the arrangement as shown by Fig. 1. When the crank arm is on the left hand side of the duct 3, as viewed in Fig. 1, the flat is improperly positioned to properly position the crank 5 on the shaft 1. This difficulty makes it necessary to form two different cranks corresponding generally to 5, that is, one with a flat in bore 6 for use when in the position as shown in Fig. 1, and a crank with a differently positioned flat in the bore 6 when used on the other side of duct 3.

My invention is directed to a construction whereby the necessity of providing two different cranks, such as 5, is avoided.

If shaft 1, which is made of a bearing metal, such as brass, is made of the same diameter on the end 8 which fits within the bore 6 as the diameter of the bore 6, and then a screw 9 is tightened to bring the portions 10 and 11 of the crank together so as to seize the end 8 of the shaft 1 in the bore 6, a rotation preventing grip is not obtained because the crank 5 is formed by a die-casting process and is made of a material such as zinc or a zinc alloy and the coefficient of friction between a brass shaft, as 1, and a zinc alloy, crank 5, is so low that although the limit of tightening of screw 9 may be utilized, the shaft may still be turned by relatively slight rotative forces applied thereto.

I propose to use a good bearing metal, such as brass, for shaft 1 so that it will rotate easily in the bearings 12 and 13 with very little friction and make the crank 5 of zinc or a zinc alloy, which is also a good bearing metal, and insert a sleeve between the end 8 of the shaft 1 and the bore 6 in the crank 5. The sleeve 14, which I insert, I make of a material, such as mild steel. Mild steel and brass have to each other a low coefficient of friction, so, in order to prevent turning of shaft 1 in the steel sleeve 14, I form a flattened or indented portion 15 on the sleeve. This prevents the turning of the shaft 14.

The sleeve 14 is split as at 16 and its wall is of such thickness that it nicely fits within the bore 6 of the crank 5.

With my construction, moreover, when I tighten the screw 9, I clamp the sleeve tightly within the bore 6 and tightly around the shaft 1 and a turning momemt applied to shaft 1 will not turn the shaft with relation to the crank 5 because a relatively slight clamping by screw 9 frictionally binds sleeve 14 in the bore 6. This is so, because the coefficient of friction between the mild steel 14 and the zinc or zinc alloy crank 5 is very high.

By employing my construction, it is not necessary to make a right hand crank 5 and a left hand crank 5 which differ only in the position of a flat in the bore 6. One crank arm 5 serves for all positions. Furthermore, adjustment may be made readily between the shaft 1 and the crank 5 by manipulation of screw 9, and when the finally desired position has been attained it is certain that it will be maintained by a moderate tightening of the screw 9.

My invention reduces a number of parts which manufacturers and maintenance men must keep and so reduces costs.

Although I have particularly described one particular physical embodiment of my invention, nevertheless, I desire to have it understood that the form selected is merely illustrative and does not exhaust the possible physical embodiments of the idea of means underlying my invention.

What I claim as new and desire to secure by Letters Patent is:

1. A shaft formed of brass and formed at one end with a flat, a split sleeve formed of mild steel positioned on the end of the shaft formed with a flat, the split sleeve formed with a flat cooperating with the flat on the shaft to prevent turning of the sleeve relatively to the shaft, a body formed of a zinc alloy formed with a through bore in which the sleeve is positioned, said body formed with a slot extending from the exterior of the body to the bore and means for moving the material on each side of the slot together so as to decrease the size of the bore and thereby frictionally grasp the sleeve whereby the shaft is prevented from turning relatively to the body and whereby the shaft may be adjusted and held in various rotated positions in regard to the body.

2. A shaft formed of brass and formed at one end with a flat, a split sleeve formed of mild steel positioned on the end of the shaft formed with the flat, the split sleeve formed with a flat cooperating with the flat on the shaft to prevent turning of the sleeve relatively to the shaft, a body formed of a zinc alloy formed with a through bore in which the sleeve is positioned, means to decrease the size of the bore and thereby frictionally grasp the sleeve whereby the shaft is prevented from turning relatively to the body and whereby the shaft may be adjusted and held in various rotated positions in regard to the body.

LAWRENCE NASS.

REFERENCES CITED

The following references are of record in the file of this patent:

UNITED STATES PATENTS

| Number | Name | Date |
|---|---|---|
| Re. 18,815 | De Tar | May 2, 1933 |
| 422,568 | Burnham | Mar. 4, 1890 |
| 643,169 | Swan | Feb. 13, 1900 |
| 1,992,901 | McIntosh | Feb. 26, 1935 |